United States Patent
Al-Banna et al.

(10) Patent No.: US 9,596,210 B2
(45) Date of Patent: Mar. 14, 2017

(54) SUBSCRIBER-AWARE DUPLICATE ADDRESS DETECTION PROXY IN EDGE DEVICES

(71) Applicant: ARRIS Enterprises, Inc., Suwanee, GA (US)

(72) Inventors: Ayham Al-Banna, Orland Park, IL (US); Erich C. Arnold, Cape Coral, FL (US)

(73) Assignee: ARRIS Enterprises, Inc., Suwanee, GA (US)

( * ) Notice: Subject to any disclaimer, the term of this patent is extended or adjusted under 35 U.S.C. 154(b) by 292 days.

(21) Appl. No.: 14/247,895

(22) Filed: Apr. 8, 2014

(65) Prior Publication Data
US 2015/0288654 A1    Oct. 8, 2015

(51) Int. Cl.
*G06F 15/16*    (2006.01)
*H04L 29/12*    (2006.01)
*H04L 29/06*    (2006.01)
*H04L 12/28*    (2006.01)

(52) U.S. Cl.
CPC ...... *H04L 61/2046* (2013.01); *H04L 12/2801* (2013.01); *H04L 61/2092* (2013.01); *H04L 63/0428* (2013.01); *H04L 61/2007* (2013.01); *H04L 61/6059* (2013.01)

(58) Field of Classification Search
CPC . H04L 61/2046; H04L 61/2092; H04L 61/20; H04L 61/2069
See application file for complete search history.

(56) References Cited

U.S. PATENT DOCUMENTS

| | | |
|---|---|---|
| 2006/0140164 A1 | 6/2006 | Patel et al. |
| 2007/0180483 A1 | 8/2007 | Popoviciu et al. |
| 2010/0322420 A1* | 12/2010 | Al-Banna ........... H04L 61/2046 709/222 |
| 2012/0224576 A1* | 9/2012 | Gu ....................... H04L 61/2046 370/390 |

OTHER PUBLICATIONS

PCT Search Report & Written Opinion, RE: Application No. PCT/US2015/022139, Jun. 16, 2015.
T. Narten, et al., "Neighbor Discovery for IP version 6 (IPv6)' RFC: 4861", Sep. 1, 2007, retrieved from the internet at <http://tools.ietf.org/pdf/rfc4861.pdf> on Jul. 14, 2014.

\* cited by examiner

*Primary Examiner* — Nam Tran
(74) *Attorney, Agent, or Firm* — Bart A. Perkins

(57) ABSTRACT

Methods, systems, and apparatus used to provide duplicate address detection in edge devices. Edge devices can include CMTS devices or DSLAMs where network nodes are not allowed to communicate with each other directly. Duplicate address detection proxies can provide duplicate address protection for network devices and can avoid the issue of broadcasting node advertisement messages to all of the devices connected to a particular downstream link.

19 Claims, 9 Drawing Sheets

SUBSCRIBER-AWARE DUPLICATE ADDRESS DETECTION PROXY IN EDGE DEVICES

TECHNICAL FIELD

This disclosure relates to duplicate address detection proxy devices.

BACKGROUND

The Data-Over-Cable Service Interface Specification (DOCSIS) was established by cable television network operators to facilitate transporting data traffic, primarily Internet traffic, over existing community antenna television (CATV) networks. In addition to transporting data traffic, as well as television content signals over a CATV network, multiple services operators (MSO) also use their CATV network infrastructure for carrying voice, video on demand (VoD) and video conferencing traffic signals, among other types.

These networks typically use internet protocol (IP) addressing schemes to address the various devices on the network. IPv6 specifies that when a new device enters the network, it transmits a node solicitation (NS) message containing the tentative address. If there are any devices on the network that have already claimed the tentative address, those devices respond with a node advertisement (NA) message.

In various architectures, this process is more difficult. For example, in cable networks, the devices do not listen to upstream channels, and therefore would not receive the NS message. However, in such systems, a headend/central office device (e.g., a cable modem termination system (CMTS) or digital subscriber line (DSL) access multiplexer (DSLAM)) can provide a duplicate address detection (DAD) proxy operable to provide NA messages for the devices connected to it.

SUMMARY

Systems and methods of this disclosure can operate to provide duplicate address detection for edge devices. Example methods can include the steps of: receiving a node solicitation message at a duplicate address detection proxy device, the node solicitation message comprising a tentative address associated with a requesting node; determining whether the tentative address is already assigned to a second node; and, if the tentative address is already assigned to a second node, generating a node advertisement message that is only received by the requesting node.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In embodiments of this disclosure, systems and methods can operate to provide duplicate address detection (DAD) proxies with the ability to communicate node advertisement (NA) messages to only the device that originated a node solicitation (NS) message, thereby reducing the chance that a device having the network address identified in the NA message does not attempt to refresh its IP address upon receiving the NA message sent from the DAD proxy on its behalf.

Figure 1:
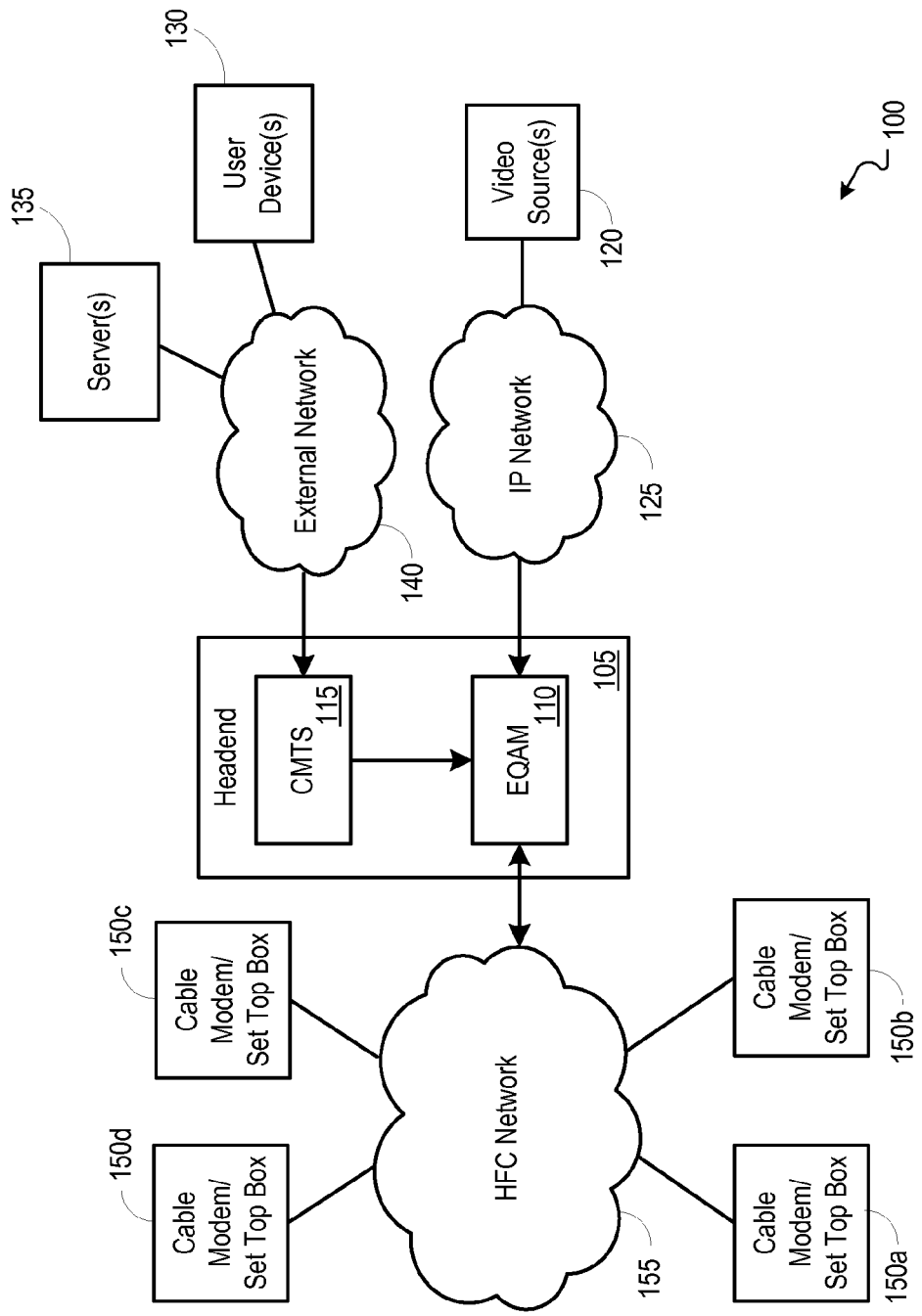
FIG. 1 is a block diagram illustrating an example network environment operable to include duplicate address detection (DAD) proxy.

FIG. 1 is a block diagram illustrating an exemplary network environment 100 operable to include latency based random early discard on network devices. In embodiments, a headend 105 can provide video, data and voice service to a subscriber. The headend 105 can include devices such as an edge quadrature amplitude modulation (EQAM) device 110 and a cable modem termination system (CMTS) 115. Video streams can be received from a video source (or sources) 120 through an IP network. In embodiments, these video streams can enter the system as raw moving picture experts group (MPEG) streams, or any other streaming video protocol supported by the headend 105 and/or EQAM device 110.

Data services can be handled by the headend 105 through a CMTS 115. The CMTS 115 can receive data signals from user device(s) 130 and server(s) 135 through an external network 140 (e.g., the Internet). The external network, for example, can operate using Internet protocol (IP), sending data packets to and receiving data packets from the headend 105. In some examples, the CMTS can be paired with a SIP proxy server operable to provide voice over internet protocol (VoIP) services with connectivity to the public switched telephone network (PSTN). In still further examples, one or more video sources may provide streaming data through the external network 140 to the CMTS 115.

The CMTS can forward received packets to the EQAM device 110 used to modulate the signal onto a carrier waveform. The carrier waveform can include both data and video streams, in both multicast and unicast (e.g., point-to-point) formats for transmission to one or more cable modems and/or set top boxes 150a-d on one or more downstream channels via a hybrid fiber-coax (HFC) network 155. It should be understood that in some implementations, the modulation functionality (or portions thereof) can be incorporated into the CMTS. Thus, a CMTS can include a modulator operable to modulate the signal onto a carrier wave and/or slot the carrier wave into a DOCSIS channel to be combined with other DOCSIS channels by a combiner.

The cable modems and/or set top boxes 150a-d can receive the downstream channels from the CMTS 115 via the HFC network 155. The downstream channels associated with a device 150a-d can be assigned during registration of the device 150a-d with the network, or reassigned by the CMTS 115. The cable modems and/or set top boxes 150a-d can also use upstream channels to transmit communications from the cable modems/set top boxes 150a-d to the CMTS 115. In embodiments, the cable modems/set top boxes 150a-d do not listen on the upstream channels, but listen on the downstream channels for signals sent from the headend 105. Thus, node solicitations sent across the network can either be forwarded back down onto the network or sub-net, or can be handled by a DAD proxy server.

Figure 2:
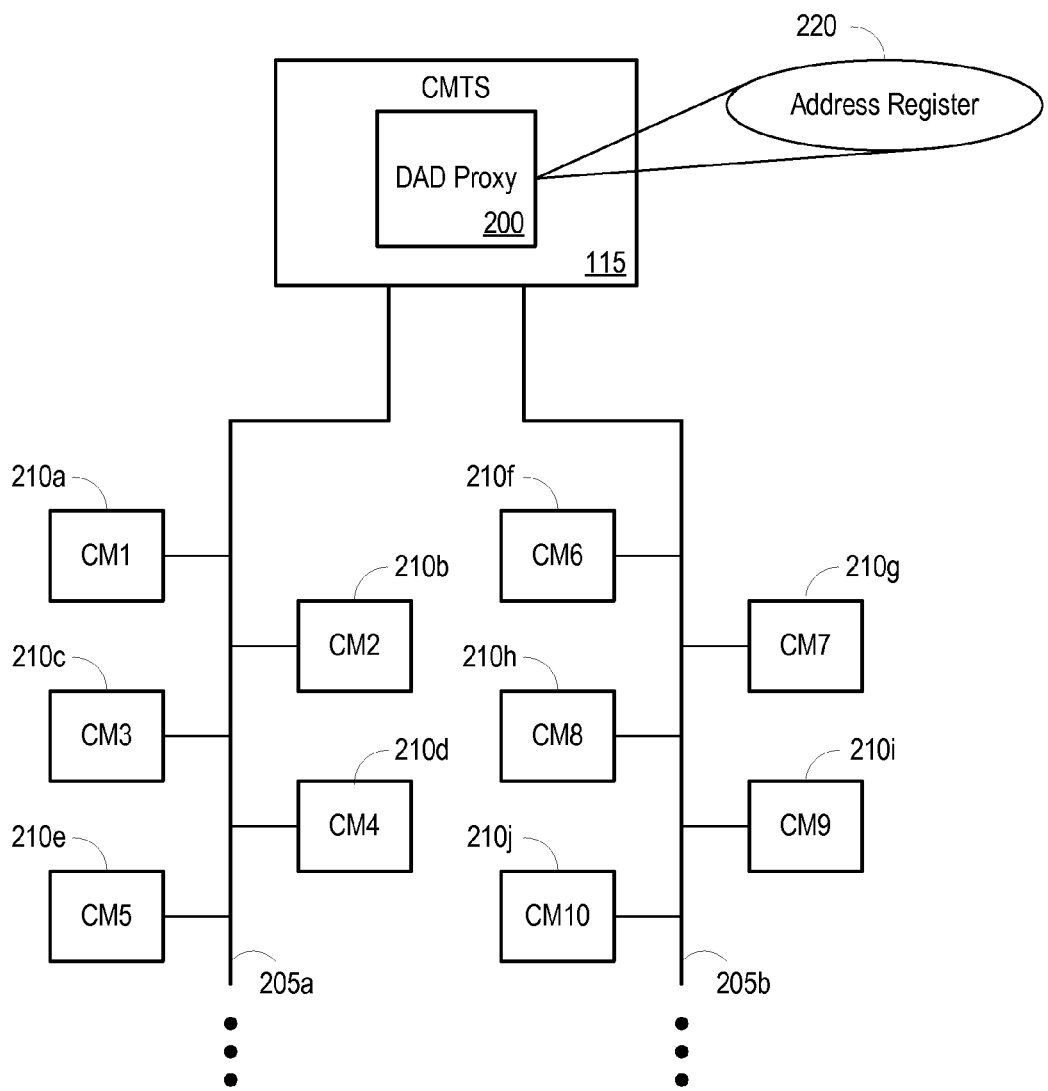
FIG. 2 is a block diagram illustrating an example network architecture for cable systems.

FIG. 2 is a block diagram illustrating an example network architecture for cable systems using the DAD proxy mechanism. A CMTS 115 can include several shared links 205a-b connecting the CMTS to several subscriber devices 210a-j. It should be understood that the links may not be physical links, but rather logical links grouping the subscriber devices together. For example, subscriber devices 210a-j might be connected to the same physical cable, but devices 210a-e are grouped together as being on link 205a because each of the devices receive downstream signals on downstream channels 3, 6, 10 and 12, while devices 210f-j are grouped together as being on link 205b because each of the devices 210f-j receive downstream signals on downstream channels 4, 5 and 8.

It should be understood that due to the arrangement of these devices 210a-j only receiving downstream signals on specified downstream channels, that the devices 210a-e do not receive the downstream signals being sent on the downstream channels associated with devices 210f-j. Similarly, devices 210f-j do not receive the downstream signals being sent on the downstream channels associated with devices 210a-e. Moreover, because the devices 210a-j do not receive signals on upstream channels, but only transmit on upstream channels, any node solicitation messages passed onto the network by one of the devices 210a-j are not received by others of the devices 210a-j. Thus, a DAD proxy 200 can be used by the CMTS 115.

The DAD proxy 200 can receive the NS messages on the upstream channels from the links 205a-b, and determine whether the address has previously been registered. The DAD proxy 200 can determine whether the address has previously been registered by checking an address register 220. Alternatively, the DAD proxy can forward the NS message onto the downstream channels and receive any NA messages back from a node that has already been assigned the solicited IP address.

In embodiments, the DAD proxy 200 can be subscriber-aware. For example, a subscriber aware DAD proxy can be operable to ascertain the identity of one or more cable modems associated with a plurality of nodes. The subscriber award DAD proxy can be further operable to generate and relay messages on behalf of a node to one or more other nodes. In embodiments, a subscriber-aware DAD proxy will only respond to a NS message with a NA message when an offending node (e.g., a node that has selected a tentative address that is the same as an address already being used by another node) and an offended node (e.g., a node that is already using an address that is the same as a tentative address that is selected by another node) are associated with different subscribers (e.g., are located behind different cable modems, or communicate with a CMTS via different cable modems).

In embodiments, where both the offending node and the offended node are located behind a single cable modem, the offended node can receive and respond to a NS message from the offending node without action from the subscriber-aware DAD proxy. For example, each node behind the same cable modem can receive a NS message that is sent from a requesting node located behind said cable modem, and each node can be operable to respond to a NS message by sending a NA message to the requesting node when the responding node is already using the address requested by the requesting node. In embodiments, the DAD proxy 200 can make a determination whether the requesting node and a node found to be already using the address requested by the requesting node are located behind the same cable modem, and where the nodes are located behind the same cable mode, the DAD proxy 200 can refrain from sending a NA message to the requesting node.

Figure 3A:
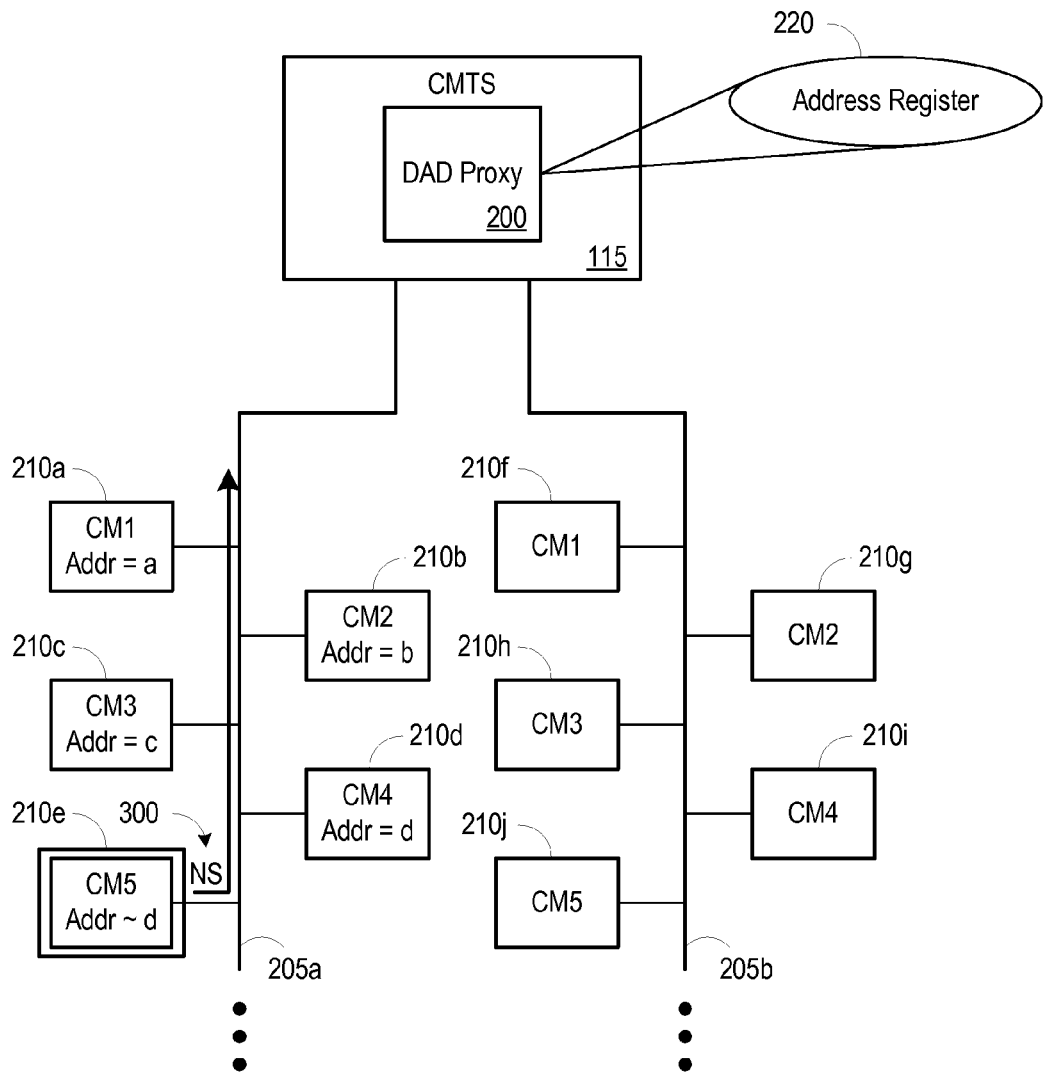
FIG. 3A is a block diagram illustrating a generation of a node solicitation message at a cable modem and a transmission of the node solicitation message from the cable modem to a DAD proxy.

FIGS. 3A-D are block diagrams illustrating an example operation of a DAD proxy and networked cable modems. In FIG. 3A, a node 210e selects a tentative address and initiates a node solicitation message 300 to be transmitted on link 205a to the CMTS 115. Because the other devices 210a-d are only listening to the downstream channels, only the CMTS 115 receives the node solicitation message.

The DAD proxy 200 then receives the NS message and determines whether the tentative address is valid based upon an address register 220. In this example, the selected tentative address is invalid, because CM5 210e has selected the tentative address d, while CM4 210d is already assigned address d. Thus, an NA message is sent to one or more nodes on the same link 205a (which includes CM4 210d). For example, the NA message can be sent to only the offending node (e.g., CM5 210e) or can be sent to all of the nodes on the link associated with the offending node (e.g., link 205a). In embodiments, the NA message can be sent to all cable modems and can be encrypted so that only the cable modem containing the offending node can decrypt the NA message. The decrypted NA message can then be received by all of the nodes, including the offending node, that are behind the cable modem that decrypts the NA message.

In embodiments, the DAD proxy 200 can make the determination whether the tentative address is currently being used by another node by generating and sending a NS message to a plurality of nodes existing on one or more links. For example, if the tentative address is not found in the address register 220, the DAD proxy 200 can send a NS message identifying the tentative address to a plurality of nodes existing in one or more links. In embodiments, if an offended node (e.g., a node with the same address as the tentative address in the NS message) receives the NS message, the offended node can generate and send a NA message upstream to the DAD proxy 200. In embodiments, if the DAD proxy 200 receives a NA message from an offended node in response to the NS message sent from the DAD proxy, the DAD proxy can generate and send a different NA message to the offending node (e.g., the node requesting use of the tentative address). In embodiments, if the DAD proxy 200 receives a NA message from an offended node in response to the NS message sent from the DAD proxy, the DAD proxy can add the tentative address, or the offended node's address, to the address register 220. In embodiments, the NA message generated by the DAD proxy 200 can be unicast to the offending node, multicast and encrypted at the link level, or both unicast and multicast. It should be understood that all messages, not only the NA message, sent from the DAD proxy 200 to an offending node can be encrypted at the link level.

Figure 3B:
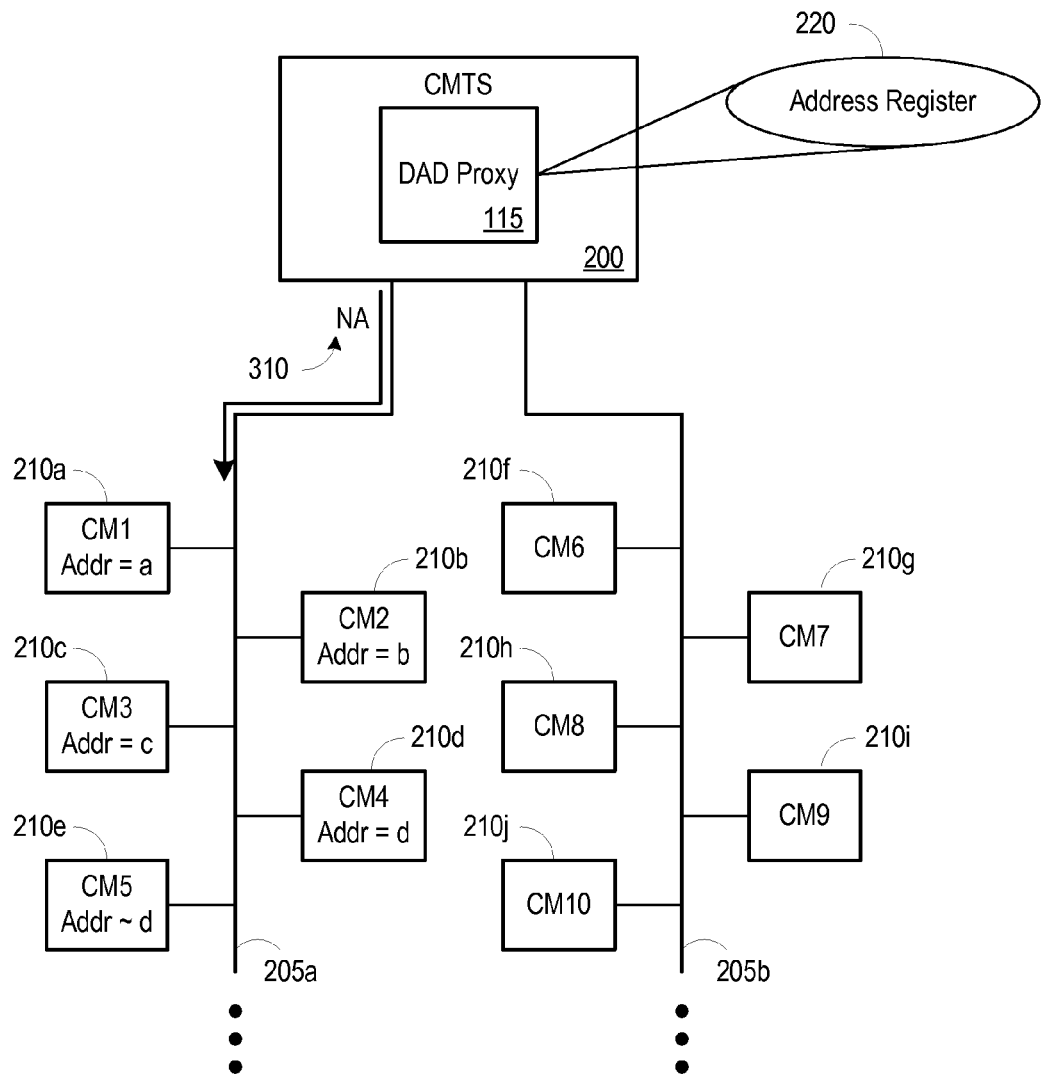
FIG. 3B is a block diagram illustrating a generation of a node advertisement message at a DAD proxy and the transmission of the node advertisement message from the DAD proxy.

In FIG. 3B, because the DAD proxy 200 determines that the requested IP address has already been assigned to CM4 210*d*, the DAD proxy 200 sends an NA message 310. The NA message is operable to let the requesting node 210*e* know that the tentative address selected is already in use. The NA message 310 can be defined by the RFCs (e.g., RFC 6861 and RFC 4862, incorporated herein by reference) and can include the following fields:

DMAC: multicast MAC address corresponding to the All_Nodes multicast IPv6 DIP below
SMAC: MAC address of the node sending the NA message
DIP: All_Nodes multicast IPv6 address
SIP: IPv6 address of the node sending the NA message (usually the target address)
Target address: tentative IPv6 address under investigation
Source Link Address: same as the SMAC In embodiments, the NA message 310 can be broadcast to all of the nodes 210*a-e* on the link 205*a*, and the NA message 310 can be encrypted so that only the requesting node 210*e* can decrypt the NA message 310. By encrypting the NA message 310 so that only the requesting node 210*e* can encrypt the NA message, the offended node (e.g., node 210*d*), will not transmit a subsequent NA message in response to the encrypted NA message.

In embodiments, a NA message can be sent to the offending node as unicast traffic. For example, a NA message can be unicast on the link-level (e.g., unicast to a specific MAC address), and the IP layer (e.g., IP address) of the NA message can be defined by the RFCs. In embodiments, the NA message can be unicast using an All-node IP address as DIP.

In embodiments, an NA message can be sent via multicast. For example, the NA message can be sent to a solicited node multicast address or an all-nodes multicast address. In embodiments, where the NA message is sent via multicast, all nodes associated with one or more links will receive the NA message, but the NA message can be encrypted such that only the cable modem containing the offending node will encrypt and process the NA message. The decrypted NA message can then be sent in the clear to all of the nodes behind the cable modem containing the offending node. In embodiments, the NA message can be multicast using an All_node IP multicast address as DIP.

In embodiments, a cable modem from which the NS message 320 was originated can receive and decrypt a NA message that is encrypted at the link level by a DAD proxy 200. For example, the cable modem can decrypt the received NA message and can direct the decrypted NA message to one or more nodes existing behind the cable modem.

Figure 3C:
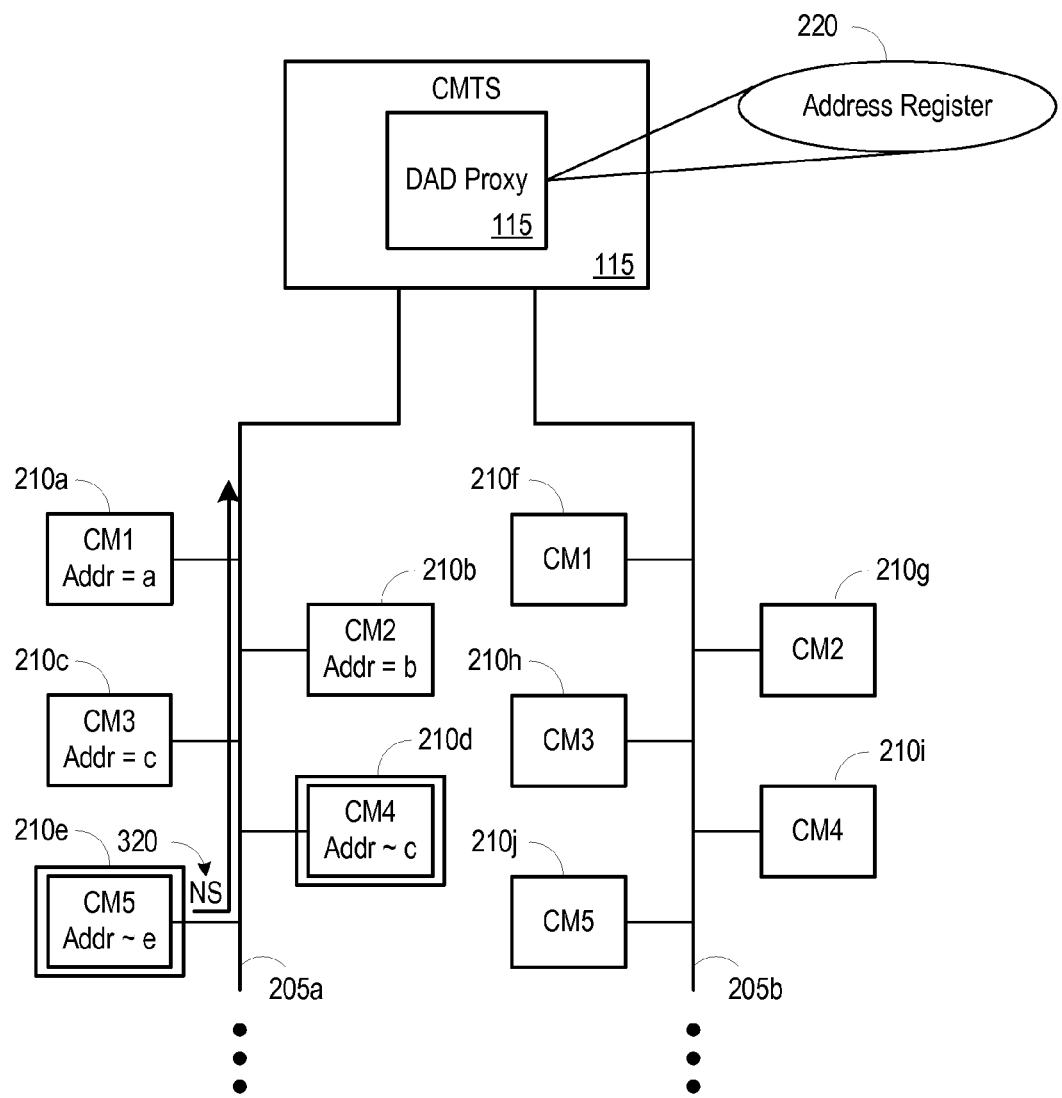
FIG. 3C is a block diagram illustrating the generation of multiple node solicitation messages at multiple cable modems in response to one or more node advertisement messages.

FIG. 3C is a block diagram that illustrates the case where the node 210*d* restarts the address assignment process anew. The node 210*e* that originated the initial node solicitation message can abandon its previous tentative address and select a new tentative address ("e"). The node 210*e* can then send a second NS message 320 with the new tentative address ("e").

Figure 3D:
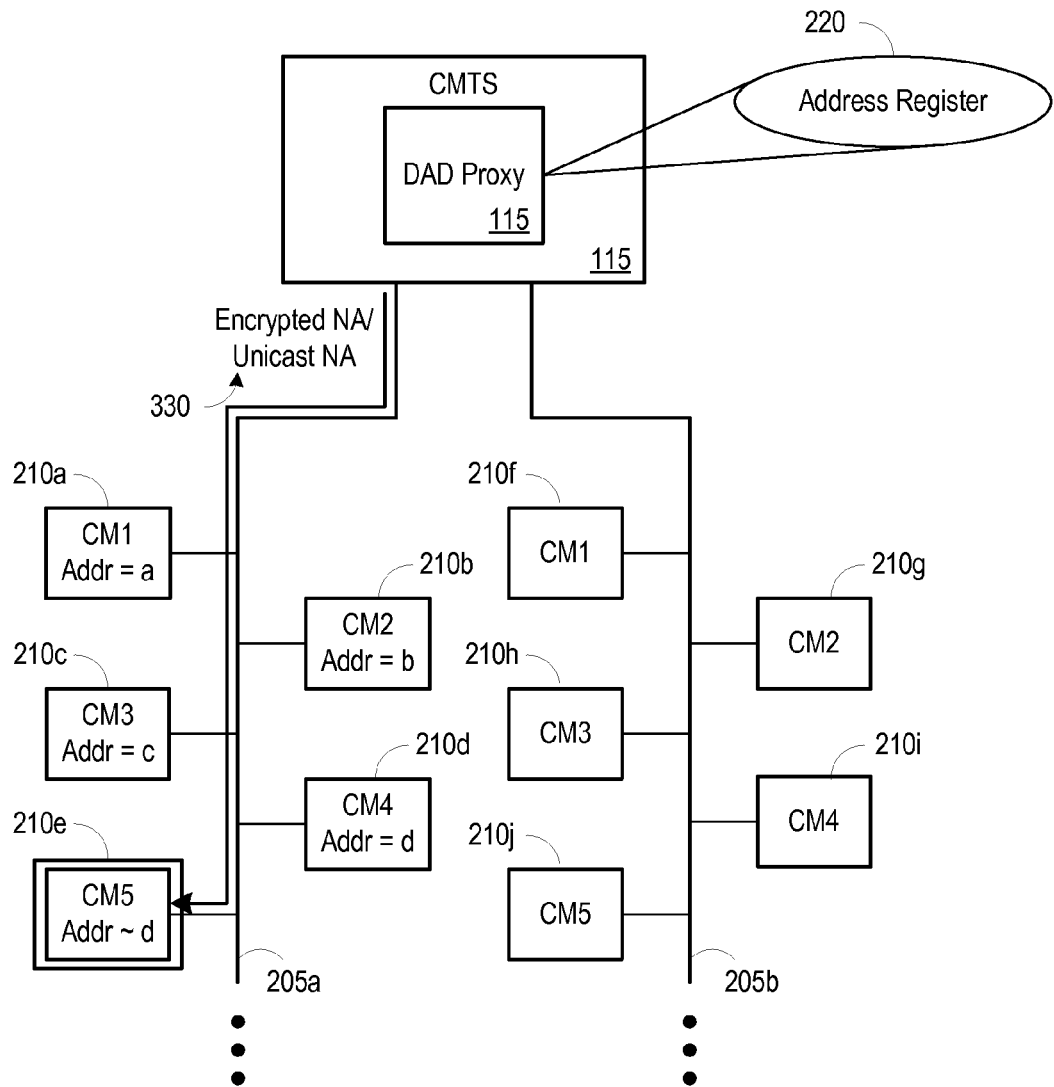
FIG. 3D is a block diagram illustrating the generation and transmission of a unicast node advertisement message from a DAD proxy to a cable modem.

FIG. 3D is a block diagram that illustrates a method for reducing or eliminating the chance that a node mistakenly interprets an NA message. In embodiments, the NA message 330 can be a unicast message. In such embodiments, the NA message can include the following fields:

DMAC: the unicast MAC address of the offending host
SMAC: MAC address of the CMTS that is sending the NA message
DIP: IPv6 All_Nodes multicast address
SIP: IPv6 Address of the CMTS that is sending the NA message
Target address: tentative address being verified In the above fields, the DMAC, the SMAC and the SIP values are values that can be different in the unicast message than respective values in a standard NA message.

The unicast message will only be processed by the node 210*e* originating the NS message, and therefore will avoid being processed by the node 210*d* that was previously assigned to the tentative address.

In embodiments, the NA message 330 can be encrypted, such that it is only decrypted by the node that originated the NS message. In this embodiment, the NA message will be the same as the NA message suggested by RFCs, but will include BPI+encryption such that only node 210*e* can decode the NA message 330.

In embodiments, the NA message 330 can be encrypted using link encryption (e.g., encrypted to address a unique MAC address). For example, using link encryption, all traffic between a CMTS and a specific cable modem (e.g., the cable modem containing an offending node) is encrypted. In embodiments, the encrypted NA message can be decrypted by the cable modem from which an associated NS message (e.g., NS message 300 of FIG. 3A) originated, and the decrypted NS message can be delivered to one or more nodes existing behind the cable modem.

Figure 4A:
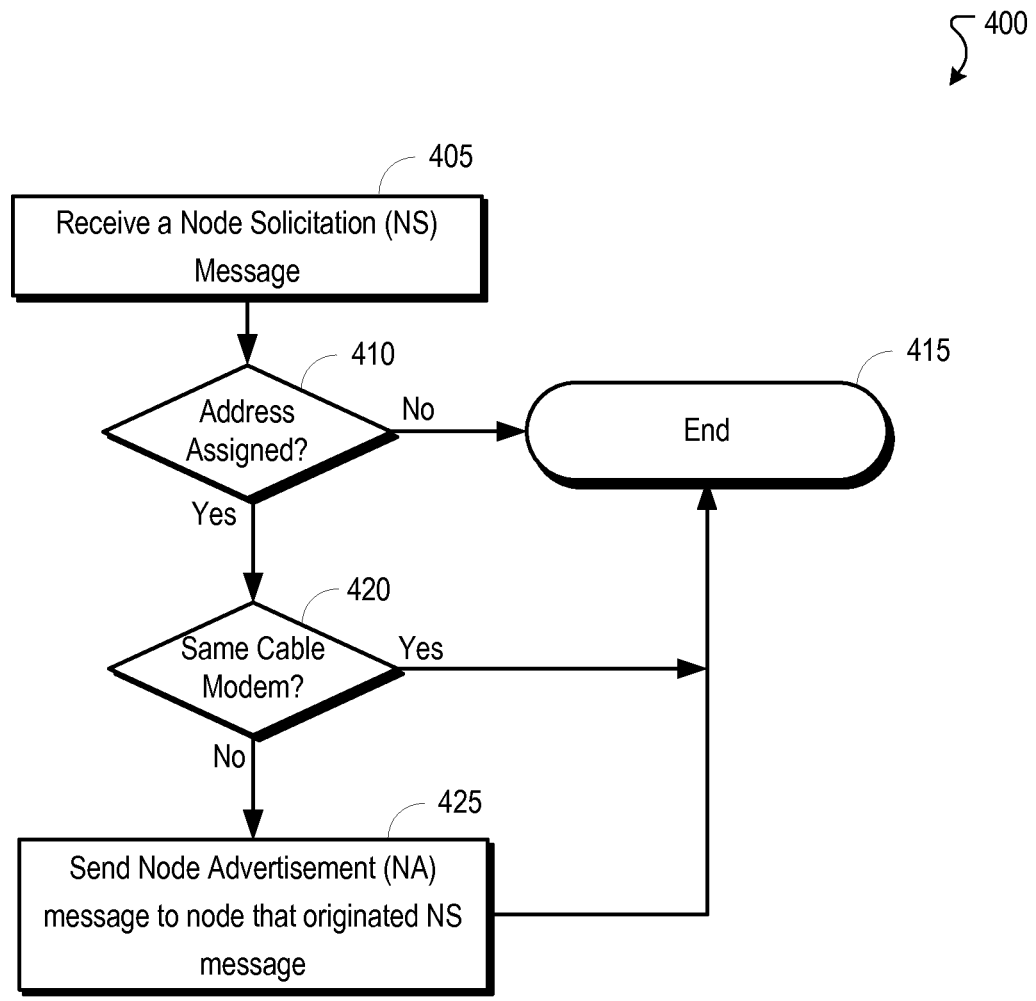
FIG. 4A is a flowchart illustrating an example process for determining whether a tentative address is currently in use by a node associated with a different cable modem than a cable modem associated with a node requesting the tentative address.

FIG. 4A is a flowchart illustrating an example process 400 for providing DAD proxy in edge devices. At 405, an NS message is received. The NS message can be received, for example, by a DAD proxy server (e.g., DAD proxy server 200 of FIG. 2) through a network link. In embodiments, the DAD proxy server resides on, or is co-located with a CMTS or a DSLAM. In embodiments, the DAD proxy server resides separately from any central office or headend devices.

At 410, a determination is made whether the address identified within the NS message has been assigned. The determination can be made, for example, by a DAD proxy server (e.g., DAD proxy 200 of FIG. 2) in conjunction with an address register (e.g., address register 220 of FIG. 2). In embodiments, the determination can be made without the address register (e.g., by resending the NS message on downstream channels and waiting for a NA response). If the address has not been assigned, the process 400 ends at 415.

If, at 410, the determination is made that the address identified within the NS message is currently assigned to a node other than the node that originated the NS message, the process 400 can proceed to 420. At 420, a determination is made whether the node from which the NS message was originated (e.g., the offending node) and the node to which the address identified within the NS message is currently assigned (e.g., the offended node) are associated with the same cable modem. The determination can be made, for example by a DAD proxy server (e.g., DAD proxy 200 of FIG. 2) or an address register (e.g., address register 220). If the determination is made that the offending node and the offended node are associated with the same cable modem (e.g., both the offending node and the offended node are located behind the same cable modem), the process 400 can end at 415.

If, at 420, the determination is made that the offending node and the offended node are not associated with the same cable modem, the process 400 can proceed to 425. At 425, a NA message is sent to the node that originated the NS message. In embodiments, the NA message can be encrypted unicast or encrypted multicast. The unicast or encrypted NA message can be sent, for example, by a DAD proxy server (e.g., DAD proxy 200 of FIG. 2) over a downstream link including the node that originated the NS message. The encryption can ensure that only the intended node (e.g., the node that originated the NS message) is able to decode the NA message, instead of the RFC proposed broadcast of the NA message which would be parsed by every node. Alternatively, a unicast message can also help to ensure that only the intended node receives the NA message. The process 400 ends at 415.

Figure 4B:
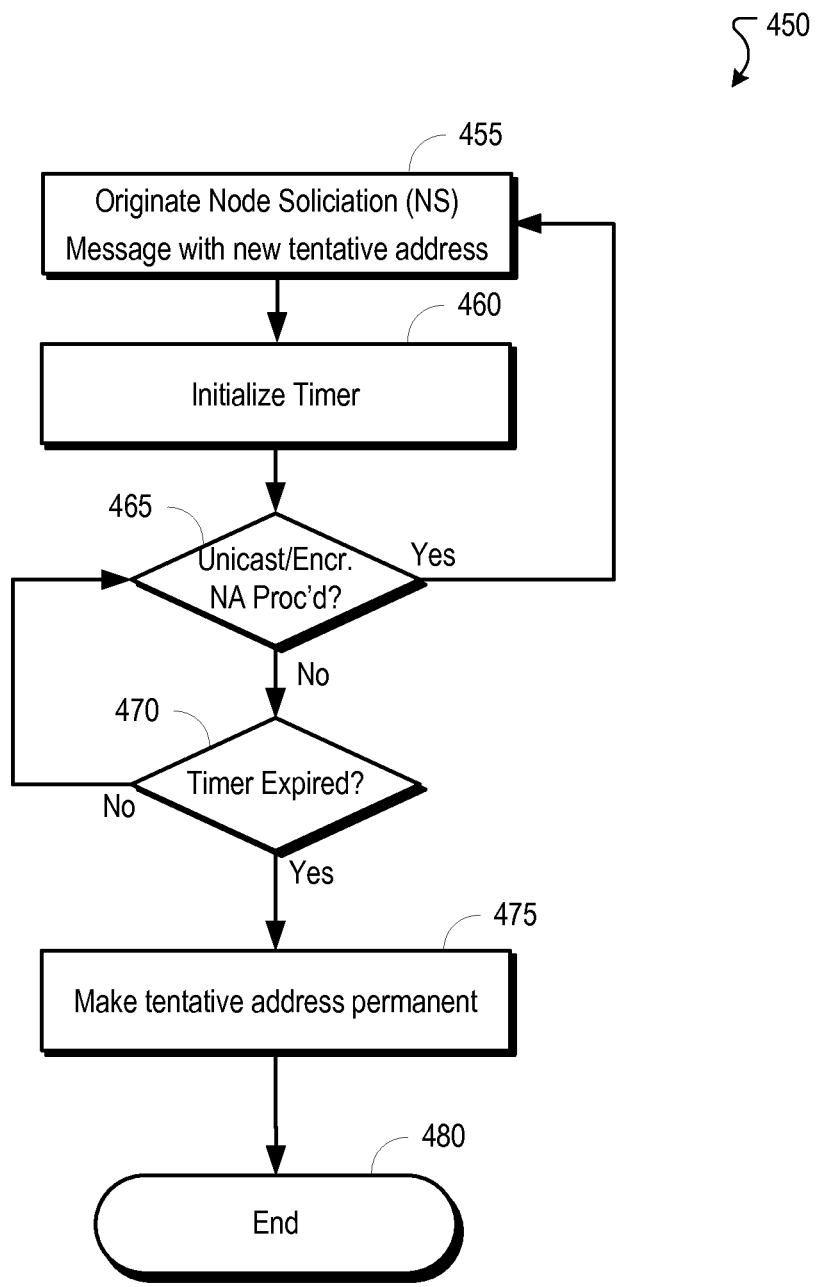
FIG. 4B is a flowchart illustrating an example process making a determination whether to make a tentative address permanent within a node.

FIG. 4B is a flowchart illustrating an example process 450 for providing DAD proxy in node devices. The process 450 begins at 455, where an NS message is originated. The NS message can be originated, for example, by a network device (e.g., nodes 210a-j of FIG. 2) using an upstream transmission link. In embodiments, the NS message can be substantially similar to the NS message format proposed by the RFCs. The NS message can also include a tentative IP address for the node originating the NS message.

At 460, a timer is initialized. The timer can be initialized, for example, by a network device (e.g., node 210a-j of FIG. 2) originating the NS message. In embodiments, the value of the timer can be defined by the RFCs or standard. The timer typically defines the period of time the node will wait before assuming that the requested tentative address is not used.

At 465, a determination is made whether a unicast or encrypted NA message has been processed. The unicast or encrypted NA can be processed, for example, by a network device (e.g., node 210a-j of FIG. 2). If a unicast or encrypted NA is processed, the process 450 returns to 455, where a new tentative address is selected and 460 and 465 repeat.

Alternatively, if no unicast or encrypted NA message has been processed, the process can proceed to 470 where a determination is made whether the timer has expired. If the timer has not expired, the process 450 continues to wait at 465 for an encrypted or unicast NA until the timer has expired. If the timer has expired, the process proceeds to 475 where the tentative address is made permanent. The tentative address can be made permanent, for example, by a network device (e.g., node 210a-j of FIG. 2). The process then ends at 480.

Figure 5:
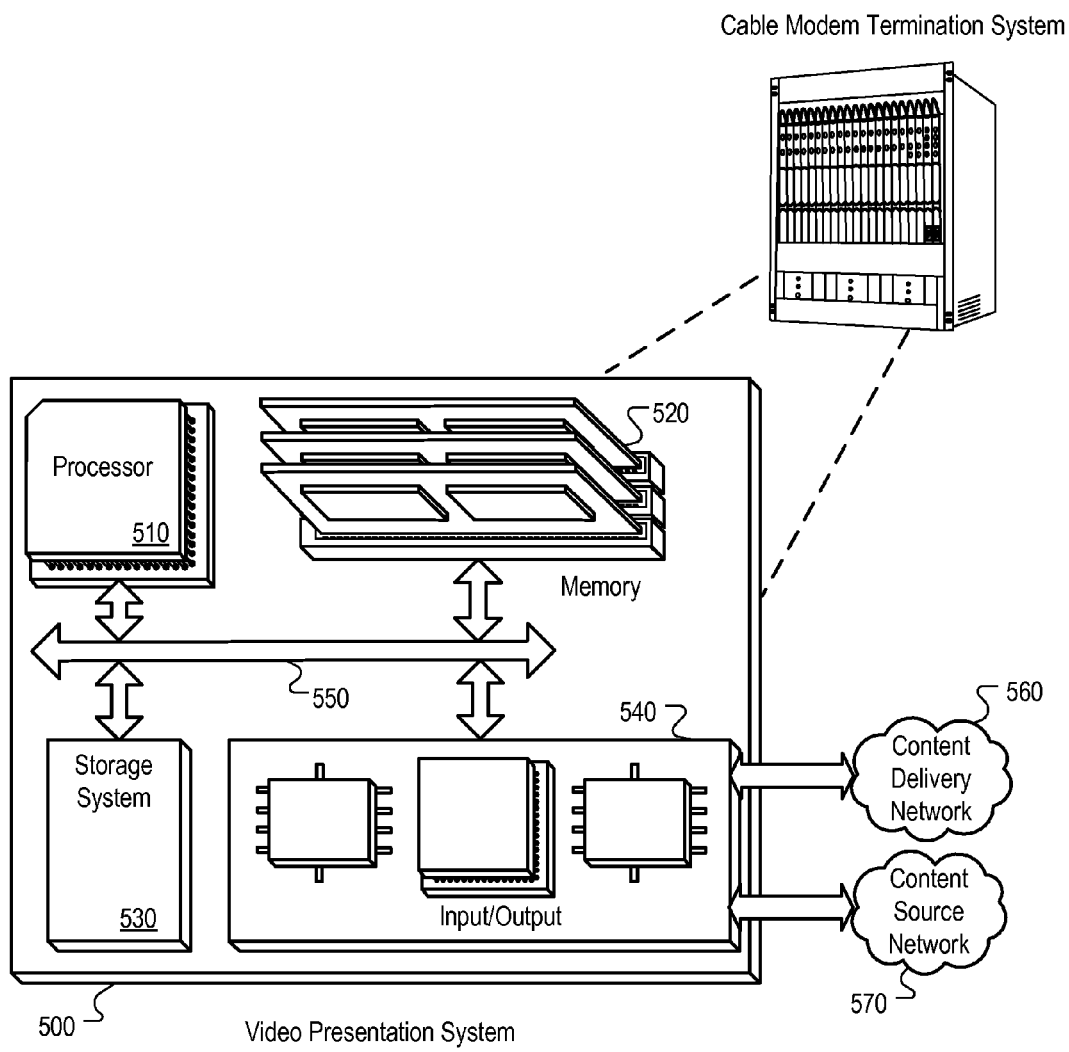
FIG. 5 is a block diagram of an example CMTS device that can include a DAD proxy.

FIG. 5 is a block diagram of an example CMTS device that can include a DAD proxy. However, it should be understood that many different kinds of network devices (e.g., including network hubs, bridges, routers, edge termination devices, DSLAM, etc.) can implement a DAD proxy system for edge devices. The CMTS 500 can include a processor 510, a memory 520, a storage device 530, and an input/output device 540. Each of the components 510, 520, 530, and 540 can, for example, be interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

In some implementations, the storage device 530 is capable of providing mass storage for the system 500. In one implementation, the storage device 530 is a computer-readable medium. In various different implementations, the storage device 530 can, for example, include a hard disk device, an optical disk device, flash memory or some other large capacity storage device.

The input/output device 540 provides input/output operations for the system 500. In one implementation, the input/output device 540 can include one or more of a plain old telephone interface (e.g., an RJ11 connector), a network interface device, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, such as one or more CPE devices 560 (e.g., set top box, cable modem, etc.), as well as sending communications to, and receiving communications from a network 570. Other implementations, however, can also be used, such as mobile computing devices, mobile communication devices, set-top box television client devices, etc.

The network device (e.g., CMTS, EQAM, network router, etc.) of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A method, comprising:
   receiving a node solicitation message at a subscriber-aware duplicate address detection proxy device, the node solicitation message comprising a tentative address associated with a requesting node, wherein the subscriber-aware duplicate address detection proxy device responds when an offending node and an offended node are located behind two different subscriber cable modems;
   determining whether the tentative address is already assigned to another node;
   if the tentative address is already assigned to the other node, determining that the tentative address is a duplicate address;
   determining whether the requesting node and the other node are located behind different subscriber cable modems; and
   if the tentative address is a duplicate address and the requesting node and the other node are located behind different subscriber cable modems, generating a node advertisement message and outputting the node advertisement message to the requesting node, wherein the node advertisement message provides a notification to the requesting node that the tentative address is not available to the requesting node as a permanent address; and if the tentative address is a duplicate address and the requesting node and the other node are located behind the same subscriber cable modem, refraining from outputting a node advertisement message to the requesting node in response to the node solicitation message.

2. The method of claim 1, wherein determining whether the tentative address is already assigned to another node comprises checking an address registry to determine whether the tentative address is currently assigned to a node associated with a different subscriber than a subscriber associated with the requesting node.

3. The method of claim 1, wherein determining whether the tentative address is already assigned to another node comprises:
forwarding the node solicitation message onto one or more links; and
if the tentative address is already assigned to another node, receiving a node advertisement message from the other node.

4. The method of claim 1, wherein the node advertisement message is a unicast message and is generated and output such that the node advertisement message is received only by the requesting node.

5. The method of claim 1, wherein the node advertisement message is a multicast message that is generated and output such that a plurality of nodes receive the node advertisement message, and the node advertisement message is encrypted such that only a subscriber cable modem associated with the requesting node can decrypt the encrypted node advertisement message so that all of the nodes behind the subscriber cable modem associated with the requesting node receive the decrypted node advertisement message.

6. The method of claim 5, wherein the node advertisement message is encrypted using a baseline privacy interface plus encryption.

7. The method of claim 1, wherein the subscriber-aware duplicate address detection proxy is included within a cable modem termination system.

8. The method of claim 1, wherein the subscriber-aware duplicate address detection proxy is included within a digital subscriber line access multiplexer.

9. The method of claim 1, wherein the subscriber-aware duplicate address detection proxy is included within an edge device.

10. A subscriber-aware duplicate address detection proxy system, comprising:
a network interface operable to receive a node solicitation message, the node solicitation message comprising a tentative address associated with a requesting node;
a duplicate address identification module operable to determine whether the tentative address is already assigned to another node;
a module operable to determine whether the requesting node and another node are located behind different subscriber cable modems; and
wherein if the tentative address is already assigned to another node, the module is further operable to determine that the tentative address is a duplicate address; and
wherein if the tentative address is a duplicate address and the requesting node and the other node are located behind different subscriber cable modems, the network interface is operable to output a node advertisement message to the requesting node, wherein the node advertisement message provides a notification to the requesting node that the tentative address is not available to the requesting node as a permanent address; and
wherein if the tentative address is a duplicate address and the requesting node and the other node are located behind the same subscriber cable modem, the network interface is operable to refrain from outputting a node advertisement message to the requesting node in response to the node solicitation message.

11. The system of claim 10, wherein the duplicate address identification module is operable to check an address registry to determine whether the tentative address is currently assigned to a different subscriber than a subscriber associated with the requesting node.

12. The system of claim 10, wherein the duplicate address identification module is operable to forward the node solicitation message over one or more links, and to receive a node advertisement message from a second node coupled to one of the plurality of links.

13. The system of claim 10, wherein the node advertisement message comprises a unicast message to the requesting node.

14. The system of claim 10, wherein the node advertisement message comprises an encrypted node advertisement message, encrypted such that only the requesting node can decode the encrypted node advertisement message.

15. The system of claim 14, wherein the node advertisement message is encrypted using a baseline privacy interface plus encryption.

16. The system of claim 10, wherein the system is included within a cable modem termination system.

17. The system of claim 10, wherein the system is included within a digital subscriber line access multiplexer.

18. The system of claim 10, wherein the system is included within an edge device.

19. A computer-implemented method comprising:
generating a node solicitation message at a requesting node, wherein the node solicitation message comprises a tentative address;
outputting the node solicitation message to a subscriber-aware duplicate address detection proxy device;
initializing a timer when the node solicitation message is output to the subscriber-aware duplicate address detection proxy device;
where a node advertisement message is received at the requesting node prior to the expiration of the timer, the node advertisement message being output from the subscriber-aware duplicate address detection proxy device in response to a determination that the tentative address is assigned to another node and that the requesting node and the other node are located behind two different subscriber cable modems:
generating another node solicitation message at the requesting node, wherein the other node solicitation message comprises a different tentative address; and
transmitting the other node solicitation message to the subscriber-aware duplicate address detection proxy device; and
where a node advertisement message is not received at the requesting node prior to the expiration of the timer, establishing the tentative address as the permanent address for the requesting node
where in response to a determination that the tentative address is assigned to the other node and the requesting node and the other node are located behind the same subscriber cable modem, refraining from outputting a node advertisement message to the requesting node in response to the node solicitation message.

* * * * *